United States Patent [19]
Tachibana

[11] 3,863,119
[45] Jan. 28, 1975

[54] COMMUTATORLESS MOTOR APPARATUS
[75] Inventor: Kyozo Tachibana, Katsuta, Japan
[73] Assignee: Hitachi, Ltd., Tokyo, Japan
[22] Filed: Mar. 1, 1974
[21] Appl. No.: 447,356

[30] Foreign Application Priority Data
Mar. 2, 1973   Japan................................ 48-25329

[52] U.S. Cl..................... 318/82, 318/52, 318/113, 321/27 R, 321/66, 323/123
[51] Int. Cl. ............................................ H02p 7/68
[58] Field of Search .... 323/119, 123; 321/26, 27 R, 321/65, 69 R; 318/52, 67, 82, 83, 111, 113, 171, 172, 227

[56] References Cited
UNITED STATES PATENTS
| | | | |
|---|---|---|---|
| 3,419,786 | 12/1968 | Brane................................. | 321/27 R |
| 3,535,603 | 10/1970 | Droste et al. ..................... | 321/27 R |
| 3,663,875 | 5/1972 | Ashiya................................. | 318/52 |
| 3,720,863 | 3/1973 | Ringland et al...................... | 318/67 |

Primary Examiner—William H. Beha, Jr.
Attorney, Agent, or Firm—Craig & Antonelli

[57] ABSTRACT

A commutatorless motor apparatus is disclosed which comprises a plurality of commutatorless motors each including a synchronous motor to which power is supplied through thyristor power converters in controlling the commutatorless motors simultaneously, a power transformer including a plurality of secondary windings independent of each other and in the same number as the commutatorless motors, a series circuit including the plurality of commutatorless motors, at least one smoothing reactor inserted in the series circuit, and means for connecting the secondary windings to the junction points of the commutatorless motors.

8 Claims, 10 Drawing Figures

COMMUTATORLESS MOTOR APPARATUS

BACKGROUND OF THE INVENTION

1. Field of the Invention

This invention relates to a commutatorless motor apparatus for controlling simultaneously a plurality of commutatorless motors driven by supplying power to synchronous motors through thyristor power converters whereby an alternating current is converted into another alternating current.

A commutatorless motor comprises a combination of a thyristor converter and a synchronous motor is such that the thyristors constituting the thyristor converter are fired in a predetermined sequence in accordance with the positions of the rotor as relative to the positions of the stator of the synchronous motor, the commutatorless motor being hereinafter referred to as the "thyristor motor" for the purpose of the present specification. The present invention is especially suitably used for driving AC powered vehicles.

2. Description Of the Prior Art

It is well known that the thyristor motor comprising a thyristor converter and a synchronous motor is of two types: One is the type in which the thyristor converter functions as a DC-AC inverter if a DC power supply is involved and the other is the cycloconverter type in which the thyristor converter effects AC-DC conversion of an AC power supply.

The thyristor motor of the cycloconverter type is so constructed that communication of the AC power supply is effected without fail at every half cycle of the power in the initial period when the inversely induced electromotive force of the motor is not yet established, and therefore interphase commutation of the armature current of the motor by the thyristors is assured. The DC output voltage of the thyristors may be changed by controlling the firing angle of the thyristors, thus enabling motor speed regulation. As a result, it is possible to perform stable operation of the motor over the entire speed range from zero to high speeds without any commutation device.

Even if the firing angle of the thyristors is made large and the DC output voltage of the thyristors made small, however, the source current, that is, DC output current always flows at the current width of 180°. This causes a large reactive power to be supplied by the AC power supply, resulting in a low power factor of the power supply. Specifically, the power factor is lowest at the firing angle of 90°. Further, the source current is transformed into a rectangular shape by the action of the smoothing reactor so that it is subjected to sudden variations from positive maximum level to negative maximum level, with the result that more higher harmonics are undesirably included in the source current.

In recent years, the thyristor motor has come to be employed to drive AC powered vehicle. The use of the thyristor motors as drive motors for the AC powered vehicle requires simultaneous regulation of a plurality of thyristor motors, which in turn makes it necessary to not only improve the power factor of the power supply but also decrease the higher harmonics in the rectangular wave signals.

Under the circumstances, however, no effective means have so far been suggested to improve the power factor of the power supply and decrease the higher harmonics in simultaneous regulation of the thyristor motors.

SUMMARY OF THE INVENTION

It is accordingly an object of the present invention to provide a comutatorless motor apparatus which is capable of improving the power factor of the power supply and at the same time reducing the higher harmonics in regulating simultaneously a plurality of thyristor motors.

Another object of the invention is to provide a highly economical commutatorless motor apparatus.

Still another object of the invention is to provide commutatorless motor apparatus which is capable of controlling the torque of the thyristors independently of each other.

According to one aspect of the invention, a plurality of thyristor motors are connected in series, a power transformer is provided with as many independent secondary windings as the thyristor motors, the secondary windings are connected to the junction points of the series connected thyristor motors respectively, and the output voltage of the secondary windings is rectified by a rectifier circuit comprising the positive side of the cycloconverter of one thyristor motor and the negative side of the cycloconverter of another thyristor motor.

According to another aspect of the invention, at least one of the plurality of secondary windings of the power transformer produces an output voltage different from those of the other secondary windings.

A third feature of the invention resides in the fact that the control lead angles of the plurality of thyristors are capable of being regulated independently.

DESCRIPTION OF THE PREFERRED EMBODIMENTS

Figure 1:
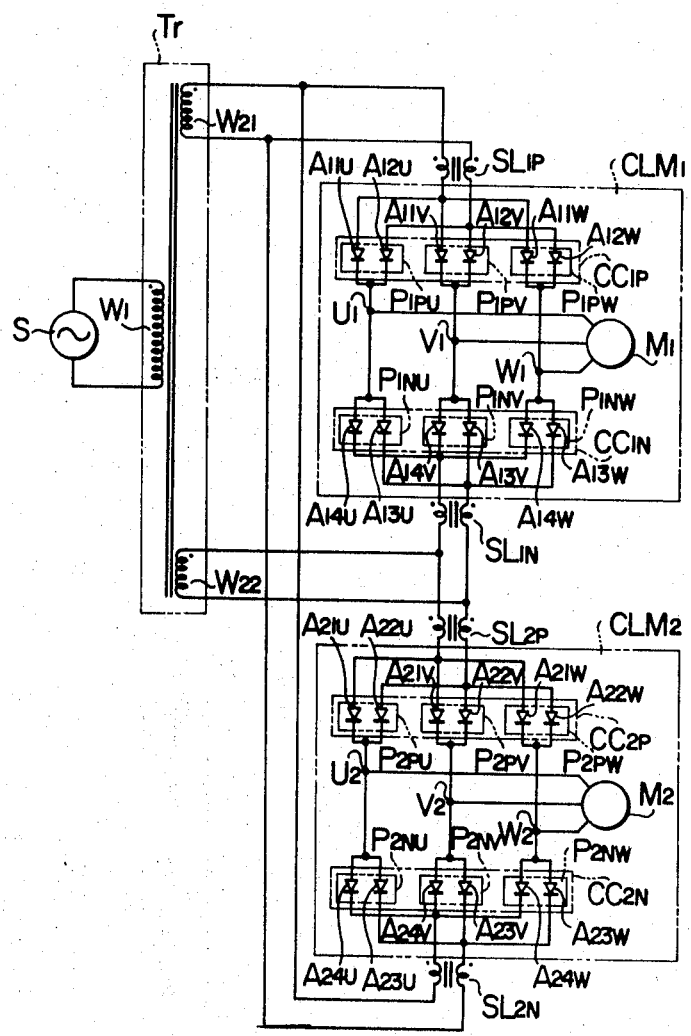
FIG. 1 shows a main circuit of an embodiment of the invention.

The main circuit of an embodiment of the invention which is a case where a couple of thyristors are used is shown in FIG. 1. In this drawing, reference symbol S shows an AC power supply, symbol Tr a power transformer including a couple of independent secondary windings $W_{21}$ and $W_{22}$ as well as the primary winding $W_1$, and symbols $CLM_1$ and $CLM_2$ thyristor motors each including a cycloconverter and a synchronous motor $M_1$ and $M_2$. Each of the cycloconverters includes a plurality of thyristors A divided into a positive portion $CC_P$ and negative portion $CC_N$, each of which in turn comprises parallel-connected arm pairs $P_{PU}$, $P_{PV}$, $P_{PW}$ and $P_{NU}$, $P_{NV}$, $P_{NW}$ respectively representing the phases U, V and W. The positive portion $CC_P$ and negative portion $CC_N$ of the cycloconverter and the poles $P_{PU}$, $P_{PV}$, $P_{PW}$ and $P_{NU}$, $P_{NV}$, $P_{NW}$ are suffixed with numbers corresponding to the first thyristor motor $CLM_1$, the second thyristor motor $CLM_2$ and so on. In similar manner, the thyristors A have suffixes representing the respective numbers of the thyristor motors, arm pairs and phases. Symbols $SL_{1P}$, $SL_{1N}$, $SL_{2P}$ and $SL_{2N}$ show smoothing reactors, symbols $U_1$, $V_1$ and $W_1$ and $U_2$, $V_2$ and $W_2$ motor terminals. The round solid spots in the power transformer Tr and its windings and smoothing reactors indentify the polarity of the points involved.

Figure 2:
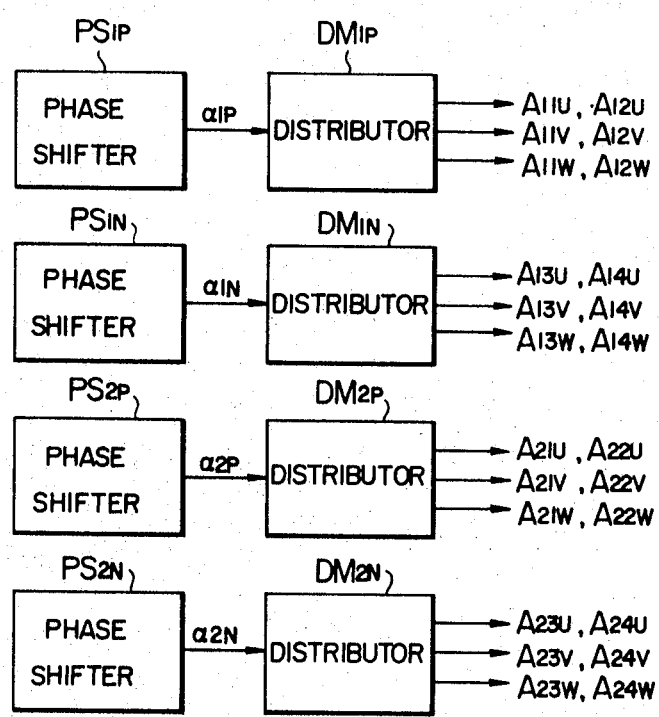
FIG. 2 is a block diagram showing gate control means.

Referring to FIG. 2 showing a block diagram of the gate control means for controlling the firing of the thyristors A of the cycloconverter, reference symbols $PS_{1P}$, $PS_{1N}$, $PS_{2P}$ and $PS_{2N}$ show phase shifters of producing gate signals $\alpha_{1P}$, $\alpha_{1N}$, $\alpha_{2P}$ and $\alpha_{2N}$ which are controllable independently for the purpose of controlling of firing of the thyristors. The gate signals from the respective phase shifters are applied to the corresponding distributors $DM_{1P}$, $DM_{1N}$, $DM_{2P}$ and $DM_{2N}$ which divide the input thereto and produce division signals representing the positions of the rotors of the motors $M_1$ and $M_2$ or the voltage phases of the armatures thereof. The output signals thus produced from the distributors are applied to the respective arms of the positive portions $CC_{1P}$ and $CC_{2P}$ or negative portions $CC_{1N}$ and $CC_{2N}$ of the cycloconverters.

The operation of the embodiment illustrated above will be explained below.

Figure 3:
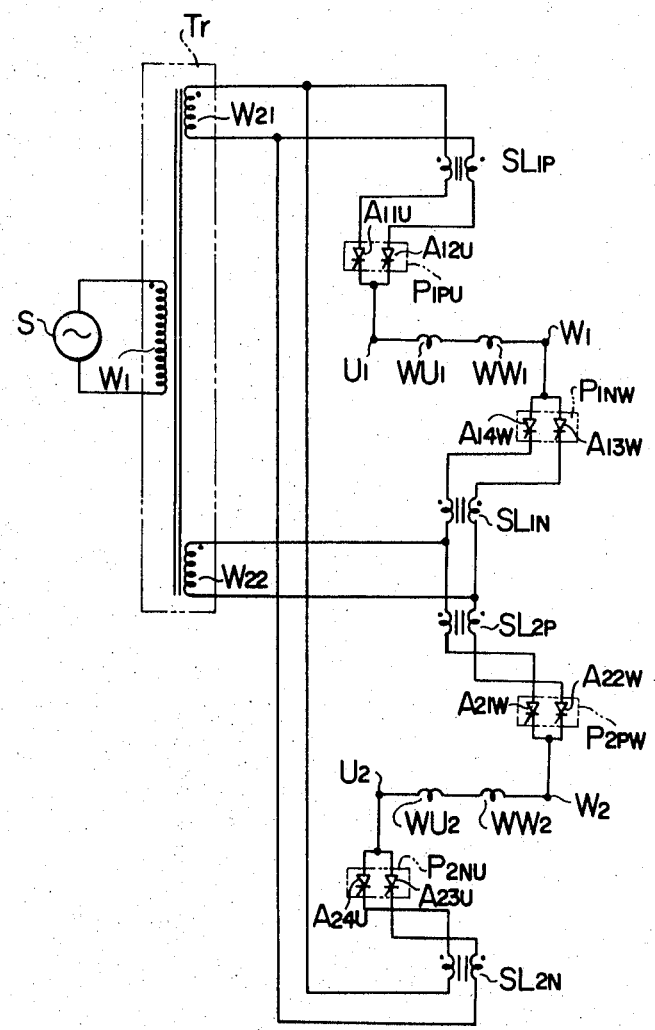
FIG. 3 is a circuit diagram for explaining the operation of the circuit of FIG. 1.

Assuming that division signals are applied to the arm pairs $P_{1PU}$ and $P_{1NW}$ of the positive and negative portions of the cycloconverter of the first thyristor motor $CLM_1$ and arm pairs $P_{2PW}$ and $P_{2NU}$ of the positive and negative portion of the cycloconverter CC of the second thyristor motor $CLM_2$, the circuit as shown in FIG. 3 is formed. The armature windings of the motors $M_1$ and $M_2$ are shown by symbols $W_{U1}$, $W_{W1}$ and $W_{W2}$, $W_{U2}$ respectively.

Figure 4:
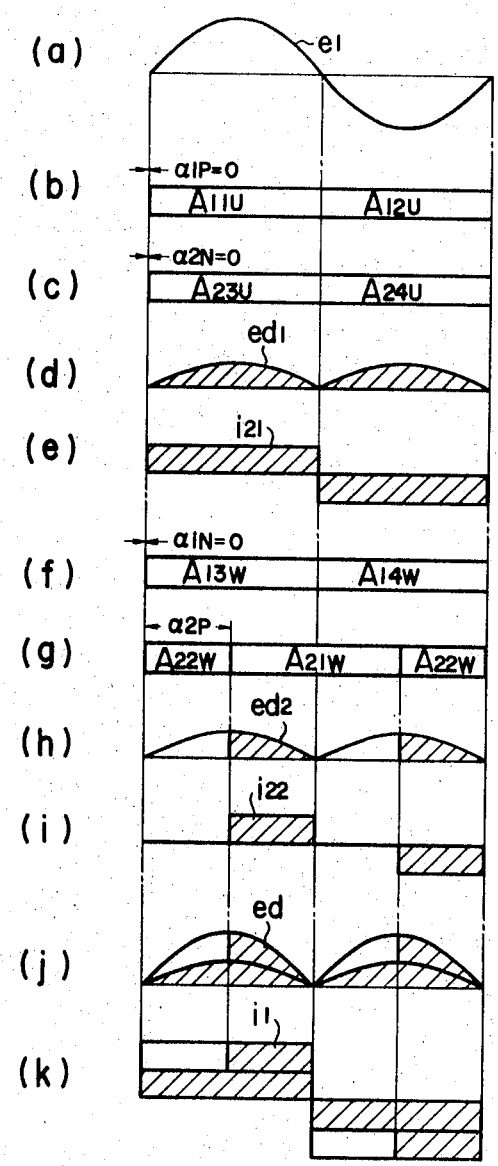
FIG. 4 is a diagram showing waveforms for explaining the operation of the circuit of FIG. 1.

In FIG. 3, when the three firing angles $\alpha_{1P}$, $\alpha_{1N}$ and $\alpha_{2N}$ among the four firing angles given by the four phase shifters in FIG. 2 are fixed at zero and $\alpha_{2P}$ is controlled, the operation of the circuit as shown in FIG. 4 results. The primary voltage $e_1$ of the power transformer Tr is shown in $a$ of FIG. 4. In response to the primary voltage $e_1$, the thyristors $A_{11U}$ and $A_{12U}$ of the arm pair $P_{1PU}$ are fired as shown in $b$ of FIG. 4, while the thyristors $A_{23U}$ and $A_{24U}$ of the arm pair $P_{2NU}$ are made to conduct as shown in $c$ thereof, a first rectifier circuit being made up of the thyristors $A_{11U}$, $A_{12U}$, $A_{23U}$ and $A_{24U}$. The first rectifier circuit rectifiers the voltage produced by the secondary winding $W_{21}$ and applies a DC voltage $e_{d1}$ across the terminals $U_2$ and $U_1$, while the current $i_{21}$ as shown in $e$ of FIG. 4 flows in the secondary winding $W_{21}$. Incidentally, the drawing ignores the voltage drops due to the smoothing reactors $SL_{1P}$ and $SL_{2N}$. On the other hand, the thyristors $A_{13W}$ and $A_{14W}$ of the arm pair $P_{1NW}$ are fired in the manner as shown in $f$ of FIG. 4, while the thyristors $A_{21W}$ and $A_{22W}$ of the arm pair $P_{2PW}$ are made to conduct as shown in $g$ of FIG. 4; the thyristors $A_{13W}$, $A_{14W}$, $A_{21W}$ and $A_{22W}$ constituting a second rectifier circuit for rectifying the voltage generated by the secondary winding $W_{22}$. The DC voltage $e_{d2}$ as shown in $h$ of FIG. 4 which is produced by the second rectifier circuit is applied between the terminals $W_1$ and $W_2$. In this case, a current $i_{22}$ as shown in $i$ of FIG. 4 which lags behind the source voltage $e_1$ by $\alpha_{2P}$ flows in the secondary winding $W_{22}$. In view of the fact that the first and second rectifier circuits are connected in series, the total DC voltage $e_d$ applied from the AC power supply S through the cycloconverters is as shown in $j$ of FIG. 4 which is the sum of the DC output voltages $e_{d1}$ and $e_{d2}$ of the first and second rectifier circuits respectively. In other words, it is possible to regulate the voltage application to the motors $M_1$ and $M_2$ by controlling the firing angle $\alpha_{2P}$.

FIG. 3 shows a case in which division signals are applied to the arm pairs of phases U and W for the thyristor motor $CLM_1$ and to the arm pairs of phases W and U for thyristor motor $CLM_2$, similar regulating procedures being followed for the other phases sequentially. In the cited case, too, the cycloconverters $CC_{1P}$, $CC_{2N}$ and $CC_{2P}$, $CC_{1N}$ constitute first and second rectifier circuits respectively for rectifying the output voltages of the secondary windings except during the commutation period.

When the firing angle $\alpha_{2P}$ reaches the maximum level near 180°, the transfer is made to control the firing angle $\alpha_{1P}$.

As will be apparent from the diagram of FIG. 4, the larger the firing angle $\alpha_{2P}$, the smaller the duration or width of the current $i_{22}$ flowing in the secondary winding $W_{22}$ resulting in a smaller apparent power of the AC power supply. Thus, according as the power supplied from the power supply is decreased, the duration of current from the power supply and the instantaneous value thereof become smaller. The result is a smaller reactive power for an improved power factor of the power supply. Also, progressive variations of the source current contributes to a reduced amount of higher harmonics.

The above-mentioned advantages are more emphasized by increasing the number of thyristor motors in series and the secondary windings of the power transformer.

Another advantage of the invention lies in the fact that since a plurality of thyristor motors are connected in series, the current level is equalized and that erroneous energization of the cycloconverter of one of the plurality of thyristor motors does not substantially adversely affect the overall voltage variations, thus preventing undesired current increase that might otherwise occur due to the erroneous energization of a thyristor motor.

The above description of the embodiment with reference to FIG. 1 is based on the principle that the secondary windings $W_{21}$ and $W_{22}$ of the power transformer Tr produce the same output voltage, that is, the secondary windings occupy equal portions or have the same number of turns of the secondary side of the transformer.

It was already mentioned that by increasing the number of secondary windings of the power transformer it is possible to further improve the power factor of the power supply and reduce the higher harmonics. The current capacity of the thyristors, however, imposes a certain limitation on the number of windings into which the secondary side of the power transformer is to be divided.

In this connection, if the secondary side of the transformer is divided into windings of different turns for producing different amounts of output voltages from them, the same improvement in power factor and reduction in higher harmonics are achieved as if the number of the secondary windings is increased.

In FIG. 1, for example, assume that the turn ratio between the secondary windings $W_{21}$ and $W_{22}$ of the power transformer Tr is 1 to 2. In this case, currents $i_{21}$ and $i_{22}$ flowing in the secondary windings $W_{21}$ and $W_{22}$ are equal to each other, whereas the ratio of current $i_1$ induced in the primary winding $W_1$ to the currents in the secondary windings $W_{21}$ and $W_{22}$ is 1 to 2. Also, the ratio of the rectified voltage of the first rectifier circuit rectifying the output votlage of the secondary winding $W_{21}$ to that of the second rectifying the output voltage of the secondary winding $W_{22}$ is 1 to 2.

The gate control operation of the cycloconverter in the above-described case will be explained with reference to FIG. 5.

The explanation will be made of a case in which the firing angle $\alpha_{1P}$ of the positive portion $CC_{1P}$ of the cycloconverter of the thyristor motor $CLM_1$ is controlled.

The controlling of the firing angle $\alpha_{1P}$ is desirable in view of the fact that the controlled DC voltage $e_{d1}$ of the first rectifier circuit is smaller than the controlled DC voltage $e_{d2}$ of the second rectifier circuit. In other words, by so doing, both the improved power factor of the power supply and the reduction in higher harmonics are achieved even more effectively.

Figure 5:
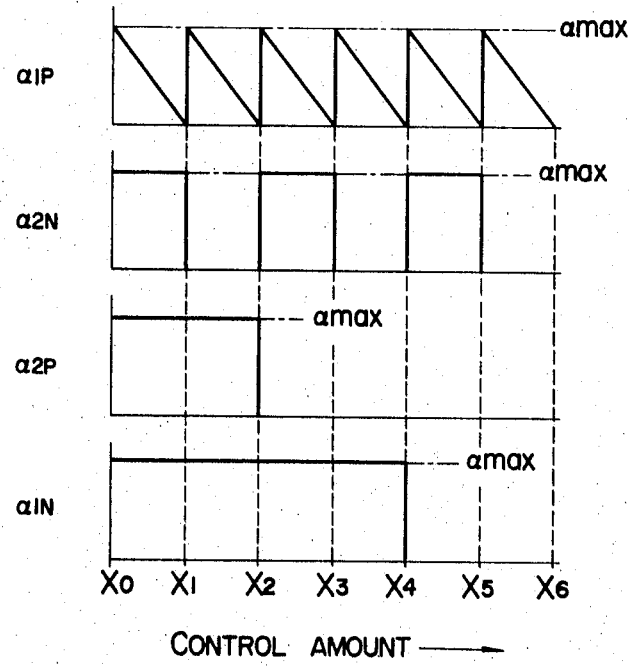
FIG. 5 is a characteristics diagram for explaining another gate control means according to the invention.

Referring to FIG. 5, from point $x_0$ to $x_1$ of the controlling range of the DC voltage $e_d$, the firing angles $\alpha_{1N}$, $\alpha_{2P}$ and $\alpha_{2N}$ are fixed while only the firing angle $\alpha_{1P}$ associated with the positive portion $CC_{1P}$ of the thyristor motor $CLM_1$ is controlled in phase. The instant the firing angle $\alpha_{1P}$ reaches its minimum level or substantially zero value at point $x_1$, it immediately returns to its maximum value $\alpha_{max}$. At the same time, the firing angle $\alpha_{2N}$ associated with the negative portion $CC_{2N}$ of the thyristor motor $CLM_2$ drops from its maximum level $\alpha_{max}$ to minimum level. In this way, even if the firing angles $\alpha_{1P}$ and $\alpha_{2N}$ are changed at point $x_1$, the DC voltage $e_d$ undergoes no change. In other words, the amount of variation of the rectified voltage $e_{d1}$ which occurs in the case where the firing angle $\alpha_{1P}$ of the positive portion $CC_{1P}$ is changed from its maximum value $\alpha_{max}$ to its minimum is equal to the amount of variation in the rectified voltage $e_{d1}$ which is caused by changing the firing angle $\alpha_{2N}$ of the negative portion $CC_{2N}$ from its maximum $\alpha_{max}$ to its minimum. As a result, if the firing angle $\alpha_{2N}$ is changed from its maximum $\alpha_{max}$ to its minimum at the same time that the firing angle $\alpha_{1P}$ is changed from its maximum to its minimum, the DC output voltage $e_{d1}$ of the first rectifier circuit remains constant.

In similar fashion, when point $x_2$ is reached where the firing angle $\alpha_{1P}$ becomes minimum by controlling the same, both the firing angles $\alpha_{1P}$ and $\alpha_{2N}$ are changed from minimum to maximum while at the same time changing from a maximum to a minimum level the firing angle $\alpha_{2P}$ for the negative portion $CC_{2P}$ of the thyristor motor $CLM_2$. In this case, the number of turns of the secondary winding $W_{22}$ is twice that of the secondary winding $W_{21}$ and therefore the amounts of variations of DC voltages $e_{d1}$ and $e_{d2}$ are equal to each other. Thus, even when the firing angle $\alpha_{2P}$ is changed from minimum to maximum simultaneously with the changing of the firing angles $\alpha_{1P}$ and $\alpha_{2N}$ from their minimum to maximum levels, the DC voltage $e_d$ remains unchanged.

The above-mentioned two types of firing angle control procedures are repeated; the former at points $x_3$ and $x_5$ and the latter at point $x_4$ thereby to control the DC voltage $e_d$ in its entirety.

In thus controlling the firing angles, the positive portions $CC_{1P}$ of the first rectifier circuit connected to the secondary winding $W_{21}$ with fewer turns is subjected to continuous phase control. This is equivalent in operation to an arrangement comprising three secondary windings of the power transformer Tr, thereby making possible further improvement in the power factor of the power supply and further reduction in higher harmonics components.

Figure 6:
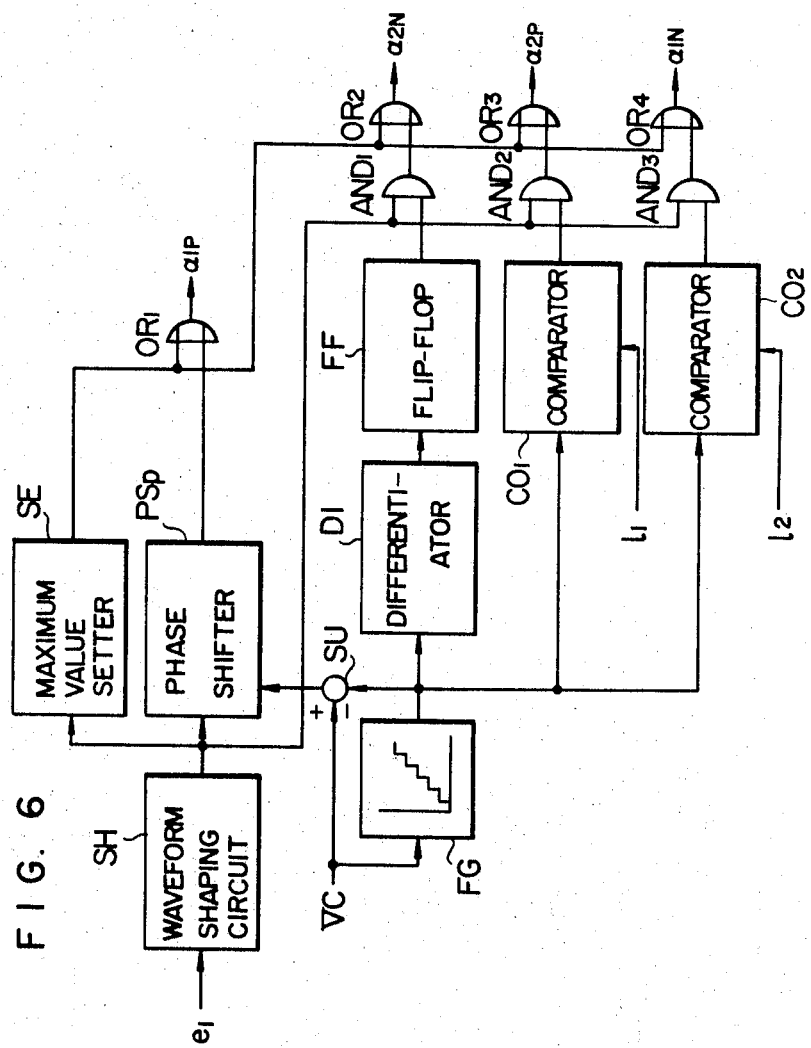
FIG. 6 is a diagram showing the construction of the gate control means for effecting the gate control operation according to the above-mentioned gate control means.

Referring next to FIG. 6 showing a block diagram of a gate control for realizing the firing regulation as described with reference to FIG. 5, symbol SH shows a waveform shaping circuit for changing the waveform of the AC voltage $e_1$ of the AC power supply S to a rectangular wave signal which may be assumed to be zero in firing angle. Symbol $PS_P$ shows a phase shifter for effecting continuous phase control, and symbol SE maximum value setting means for determining the maximum value $\alpha_{max}$ of the firing angle $\alpha_{1P}$ and producing an output signal upon receipt from the waveform shaping circuit SH a rectangular wave signal of, say, 175° electrical. Symbol FG shows a function generator for generating a signal in stepped form in response to the phase control signal Vc, symbol SU a subtractor for producing an analog difference between the phase control signal Vc and the output of the function generator, symbol DI a differentiator, symbol FF a flip-flop circuit, $CO_1$ and $CO_2$ comparators, symbols $AND_1$ to $AND_3$ AND elements and symbols $OR_1$ to $OR_4$ elements.

The operation of the circuit shown in FIG. 6 will be now explained with reference to FIG. 7.

Figure 7:
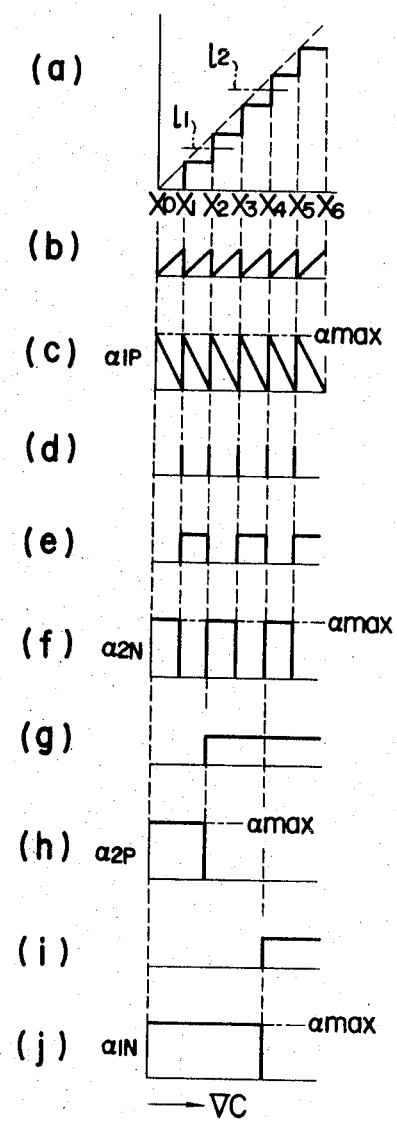
FIG. 7 is a time chart for explaining the operation of the circuit of FIG. 6.

In FIG. 7 with its abscissa representing the phase control signal Vc, it will be seen that the function generator FG produces an output signal in stepped form as shown in a of FIG. 7 in response to the magnitude of the phase control signal Vc. The difference between this stepped signal from the function generator FG and the phase control signal Vc is produced by the subtractor SU. The output of the subtractor SU is in the shape of sawtooth wave as shown in b of FIG. 7 which undergoes sudden changes at points $x_1$ to $x_5$, which saw-tooth wave signal is applied to the phase shifter $PS_P$. The phase shifter $PS_P$, in turn, produces the firing control signal $\alpha_{1P}$ as shown in c of FIG. 7 which reciprocates between maximum value $\alpha_{max}$ and minimum value six times. The differentiator DI produces a differentiated pulse signal as shown in d of FIG. 7 each time of sudden change in the stepped signal from the function generator FG at points $x_1$ and $x_5$ and applies it to the fip-flop circuit FF. The flip-flop circuit FF is set and produces a "1" signal upon the application thereto of a first differentiated pulse while it is reset and produces a "0" signal upon receipt of a second differentiated pulse from the differentiator, thus alternating between set and reset states in response to the differentiated pulses as shown in e of FIG. 7. The AND element $AND_1$ passes the rectangular wave signal from the waveform shaping circuit SH and applies it to the OR circuit $OR_2$ when the output of the flip-flop circuit FF is in the state of 1. The OR element $OR_2$ to which the output from the maximum value setter SE and the rectangular wave signal passed through the AND element $AND_1$ are applied is adapted to produce a firing control signal $\alpha_{2N}$. In other words, the OR element $OR_2$ produces a firing control signal $\alpha_{2N}$ with a minimum firing angle of zero and maximum firing angle of $\alpha_{max}$. In spite of the presence of the two firing control signals, the thyristors are fired by a firing control signal with a smaller firing angle and therefore the firing control signal with a larger firing angle is substantially assumed to be absent. As a result, the OR element $OR_2$ produces a firing control signal with the maximum firing angle of $\alpha_{max}$ set by the maximum value setter SE in the presence of an output from the AND element, while on the other hand it produces a firing control signal with the firing angle of zero in the absence of an output from the AND element $AND_1$, the firing control signal $\alpha_{2n}$ being as shown in $f$ of FIG. 7. The comparators $CO_1$ and $CO_2$ are for comparing the stepped output from the function generator FG with the set values $l_1$ and $l_2$ respectively. If the set values $l_1$ and $l_2$ are determined as shown in $a$ of FIG. 7, the comparators $CO_1$ and $CO_2$ produce outputs as shown in $g$ or $i$ of FIG. 7. In other words, the comparator $CO_1$ produces a 1 output at point $x_2$ while the comparator $CO_2$ generates a 1 signal at point $x_4$. The output of the maximum value setter SE is applied also to the OR elements $OR_3$ and $OR_4$. Therefore, a firing control signal $\alpha_{2P}$ as shown in $h$ of FIG. 7 is obtained from the OR element $OR_3$ while the OR element $OR_4$ produces a firing control signal $\alpha_{1N}$ as shown in $j$ of FIG. 7. The firing control signals $\alpha_{1P}$, $\alpha_{1N}$, $\alpha_{2P}$ and $\alpha_{2N}$ thus produced are similar to those shown in FIG. 5, resulting in desired characteristics being obtained.

It will be understood from the above description that by dividing the secondary side of the power transformer into windings of different numbers of turns the same improvement in power factor of the power supply and reduction of higher harmonics as when an increased number of secondary windings are provided is achieved.

According to the present invention, a plurality of thyristor motors are connected in series so that an equal amount of current flows in each of them, resulting in the equal torque associated with each of them. There is a case, however, where the shares of torque borne by them are required to be redistributed. Such a case occurs, for example, when some of the wheels connected to a plurality of thyristor motors used for driving AC electric vehicles turn idle or slip, in which case the torque associated with the thyristor motor coupled with the particular slipping wheel must be reduced to assure readhesion thereof to the rail.

In the cited case, the torque control may be effected by controlling the timing of the armature current flow, that is, distribution control lead angle $\gamma$ which is the amount of angle by which the current of a motor leads the phase voltage thereof. The nearer the control lead angle $\gamma$ is to 90°, the smaller is the electric power received by the motor. By contrast, the nearer the lead angle is to 0°, the power applied to the motor is greater. The torque generated by the motor is substantially proportional to the power supplied thereto, so that it is possible to control the torque thereof by adjusting the control lead angle.

Figure 8:
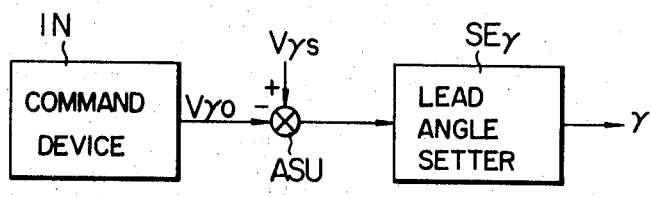
FIG. 8 is a block diagram showing a lead angle control device provided on a distributor.

The block diagram of FIG. 8 shows a control lead angle adjusting means for controlling the distribution control lead angle $\gamma$.

The control angle adjusting means as shwon in FIG. 8 is provided for each of the distributors $DM_{1P}$, $DM_{1N}$, $DM_{2P}$ and $DM_{2N}$.

Figure 9:
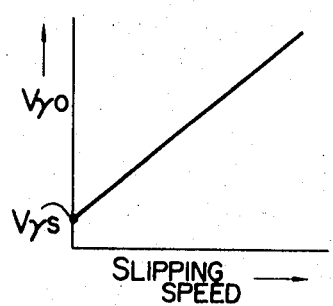
FIG. 9 is a diagram showing the output characteristics of the command device included in FIG. 8.
Figure 10:
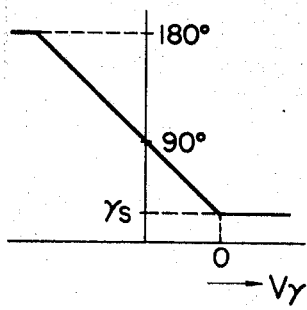
FIG. 10 is a diagram showing the operation characteristics of the circuit of FIG. 8.

In this figure, reference symbol IN shows a command device for producing a command signal $V_{\gamma o}$ of a control lead angle proportional to the slipping wheel speed as shown in FIG. 9, symbol ASU an adder-subtractor for adding the command signal $V_{\gamma o}$ to or substracting it from the minimum set value $V_{\gamma s}$ of the control lead angle, symbol $SE\gamma$ a setter for setting the control lead angle $\gamma$ on the basis of the output $V\gamma$ of the adder-subtractor ASU, the minimum set value $V_{\gamma s}$ being at, say, the level of $\gamma_s$ as shown in FIG. 10.

In the absence of a skidding situation, the command signal $V_{\gamma o}$ is zero. Therefore, the setter $SE\gamma$ sets the control lead angle at a minimum level $\gamma_s$ in accordance with the minimum set value $V_{\gamma s}$.

The command device IN produces a command signal $V_{\gamma o}$ as shown in FIG. 9 in the presence of a slipping condition. Since the command signal $V_{\gamma o}$ is larger than the set value $V_{\gamma s}$, the output $V\gamma$ of the adder-subtractor ASU becomes negative. For this reason, the setter $SE\gamma$ sets a larger control lead angle $\gamma$.

It will be needless to say that the voltage produced by the motor or a rotor position signal is applied to the setter SE .

In setting the control lead angle as above, the torque has a driving effect when $\gamma$ is between zero and 90° while it has braking effect $\gamma$ is between 90° and 180°.

As can be seen from the above explanation, the torque of each of the thyristor motors is capable of being independently controlled by adjusting the control lead angle $\gamma$, leading to a great advantage specially in its application to the driving of electric vehicles.

Further, the fact that the control lead angle is capable of being set quickly enables the response characteristics to be improved as compared with the case in which the torque control is effected by changing the current.

It will thus be seen that according to the present invention a plurality of thyristor motors are connected in series and as many independent secondary windings as the thyristors are provided and connected to corresponding junction points of the series-connected thyristor motors. The result is the possibility of successful improvement in the power factor of the power supply and reduction in higher harmonics in simultaneous regulation of thyristor motors. This advantage is more enhanced by causing at least one of the secondary windings of the power transformer to produce an output different from those of the other secondary windings. Furthermore, the torque of each thyristor motor can be controlled independently by controlling the control lead angle thereof independently.

Even though the above explanation refers to a case where the single phase power supply is involved, the invention may be applied with equal effect to the case involving the three-phase power supply.

I claim:

1. A commutatorless motor apparatus comprising a plurality of commutatorless motors each including a synchronous motor supplied by a thyristor power converter, a power transformer with as many independent secondary windings as said commutatorless motors, said commutatorless motors constituting a series circuit, at least one reactor inserted in said series circuit, and means for connecting said secondary windings to corresponding junction points of said series-connected commutatorless motors.

2. A commutatorless motor apparatus according to claim 1, in which the positive portion of the power converter of one of a couple of said series-connected thyristor motors and the negative portion of the power converter of the other of said series-connected thyristor motors constitutes a rectifier circuit for rectifying the output voltage from said secondary windings connected to said junction points.

3. A commutatorless motor apparatus according to claim 2, in which said rectifier circuits are connected in series.

4. A commutatorless motor apparatus according to claim 1, in which a plurality of reactors are inserted in said series circuit and magnetically coupled with each other.

5. A commutatorless motor apparatus according to claim 1, in which the positive portion and the negative portion of said thyristor power converter are provided with respective independent gate control means.

6. A commutatorless motor apparatus according to claim 1, in which at least one of said secondary windings of said power transformer produces an output voltage different in magnitude from those produced by the other secondary windings.

7. A commutatorless motor apparatus according to claim 6, in which the rectifier circuit(s) for rectifying the output voltage from the secondary winding(s) producing a lower output voltage than the other secondary winding(s) is controlled for the entire phase range and the other rectifier circuit(s) is controlled only at the maximum and minimum levels of said output voltage.

8. A commutatorless motor apparatus according to claim 1, in which each of said gate control devices of said thyristor power converters is capable of controlling the distribution control lead angle independently.

* * * * *